United States Patent
Hasenclever et al.

(10) Patent No.: US 11,403,513 B2
(45) Date of Patent: Aug. 2, 2022

(54) LEARNING MOTOR PRIMITIVES AND TRAINING A MACHINE LEARNING SYSTEM USING A LINEAR-FEEDBACK-STABILIZED POLICY

(71) Applicant: DeepMind Technologies Limited, London (GB)

(72) Inventors: Leonard Hasenclever, London (GB); Vu Pham, London (GB); Joshua Merel, London (GB); Alexandre Galashov, London (GB)

(73) Assignee: DeepMind Technologies Limited, London (GB)

( * ) Notice: Subject to any disclaimer, the term of this patent is extended or adjusted under 35 U.S.C. 154(b) by 0 days.

(21) Appl. No.: 16/586,087

(22) Filed: Sep. 27, 2019

(65) Prior Publication Data

US 2020/0104685 A1  Apr. 2, 2020

Related U.S. Application Data

(60) Provisional application No. 62/737,816, filed on Sep. 27, 2018.

(51) Int. Cl.
*G06N 3/04* (2006.01)
*G06N 5/00* (2006.01)
(Continued)

(52) U.S. Cl.
CPC ............ *G06N 3/0472* (2013.01); *G06F 17/18* (2013.01); *G06N 3/0454* (2013.01); *G06N 5/00* (2013.01); *G06N 20/00* (2019.01)

(58) Field of Classification Search
CPC .. G06K 9/00369; G05B 13/027; G06N 20/00; G06N 3/04; G06N 3/0454;
(Continued)

(56) References Cited

U.S. PATENT DOCUMENTS

| | | | |
|---|---|---|---|
| 6,269,172 B1 * | 7/2001 | Rehg ................. | G06K 9/00369 342/1 |
| 2012/0253514 A1 * | 10/2012 | Sugimoto .......... | G05B 13/0265 700/250 |

OTHER PUBLICATIONS

Byravan, A., Leeb, F., Meier, F., & Fox, D. (2017). Se3-pose-nets: Structured deep dynamics models for visuomotor planning and control. arXiv preprint arXiv:1710.00489. (Year: 2017).*
(Continued)

*Primary Examiner* — Michael J Huntley
*Assistant Examiner* — Oluwatosin O Alabi
(74) *Attorney, Agent, or Firm* — Fish & Richardson P.C.

(57) ABSTRACT

A computer-implemented method of training a student machine learning system comprises receiving data indicating execution of an expert, determining one or more actions performed by the expert during the execution and a corresponding state-action Jacobian, and training the student machine learning system using a linear-feedback-stabilized policy. The linear-feedback-stabilized policy may be based on the state-action Jacobian. Also a neural network system for representing a space of probabilistic motor primitives, implemented by one or more computers. The neural network system comprises an encoder configured to generate latent variables based on a plurality of inputs, each input comprising a plurality of frames, and a decoder configured to generate an action based on one or more of the latent variables and a state.

18 Claims, 5 Drawing Sheets

(51) Int. Cl.
 *G06N 20/00* (2019.01)
 *G06F 17/18* (2006.01)
(58) Field of Classification Search
 CPC ........ G06N 3/088; G06N 3/0472; G06N 5/00;
 G06F 17/18
 See application file for complete search history.

(56) References Cited

OTHER PUBLICATIONS

Byravan, A., Lceb, F., Meier, F., & Fox, D. (May 2018). Se3-posenets: Structured deep dynamics models for visuomotor control. In 2018 IEEE International Conference on Robotics and Automation (ICRA) (pp. 1-8). IEEE. (Year: 2018).*
Tsuzuki, Y., & Ogihara, N. (2018). A recurrent neural network model for generation of humanlike reaching movements. Advanced Robotics, 32(15), 837-849.Published online: Jul. 27, 2018 (Year: 2018).*
Gregor, K., Danihelka, I., Mnih, A., Blundell, C., & Wierstra, D. (2013). Deep autoregressive networks. arXiv preprint arXiv: 1310. 8499. (Year: 2013).*
Kucukelbir, A., Ranganath, R., Gelman, A., & Blei, D. (2014). Fully automatic variational inference of differentiable probability models. In NIPS Workshop on Probabilistic Programming. (Year: 2014).*
Haarnoja, T., Hartikainen, K., Abbeel, P., & Levine, S. (2018). Latent space policies for hierarchical reinforcement learning. arXiv preprint arXiv: 1804.02808. (Year: 2018).*
Mordatch, I., Lowrey, K., Andrew, G., Popovic, Z., & Todorov, E. V. (2015). Interactive control of diverse complex characters with neural networks. In Advances in Neural Information Processing Systems (pp. 3132-3140). (Year: 2015).*
Watter, M., Springenberg, J., Boedecker, J., & Riedmiller, M. (2015). Embed to control: A locally linear latent dynamics model for control from raw images. In Advances in neural information processing systems (pp. 2746-2754). (Year: 2015).*
Stulp, F., & Sigaud, O. (2013). Robot skill learning: From reinforcement learning to evolution strategies. Paladyn, Journal of Behavioral Robotics, 4(1), 49-61. (Year: 2013).*
Piergiovanni, A. J., Wu, A., & Ryoo, M. S. (2018). Learning Real-World Robot Policies by Dreaming. arXiv e-prints, arXiv-1805. (Year: 2018).*
Moerland TM, Broekens J, Plaat A, Jonker CM. A0c: Alpha zero in continuous action space. arXiv preprint arXiv:1805.09613. May 24, 2018. (Year: 2018).*
Chen, N., Karl, M., & Van Der Smagt, P. (Nov. 2016). Dynamic movement primitives in latent space of time-dependent variational autoencoders. In 2016 IEEE-RAS 16th international conference on humanoid robots (Humanoids) (pp. 629-636). IEEE. (Year: 2016).*
Ghadirzadeh A, Maki A, Kragic D, Björkman M. Deep predictive policy training using reinforcement learning. In2017 IEEE/RSJ International Conference on Intelligent Robots and Systems (IROS) Sep. 24, 2017 (pp. 2351-2358). IEEE. (Year: 2017).*
Billard A, Calinon S, Dillmann R, Schaal S. Handbook of robotics chapter 59: robot programming by demonstration. Handbook of Robotics. Springer. Jan. 3, 2008. (Year: 2008).*
Chentanez et al., "Physics-based motion capture imitation with deep reinforcement learning," In Proceedings of the 11th Annual International Conference on Motion, Interaction, and Games, Nov. 2018 https://dl.acm.org/citation.cfm?id=3274506.
Mayne, "A second-order gradient method for determining optimal trajectories of non-linear discrete-time systems," International Journal of Control, Jan. 1966, 11 pages https://www.tandfonline.com/doi/abs/10.1080/00207176608921369.
Alemi et al., "Deep variational information bottleneck," arXiv, Dec. 2016, 19 pages.
Athans, "The role and use of the stochastic linear-quadratic-Gaussian problem in control system design," IEEE transactions on automatic control, Dec. 1971, 24 pages.
Bansal et al., "Emergent complexity via multi-agent competition," arXiv, Mar. 2018, 12 pages.
Bizzi et al., "Combining modules for movement," Brain research reviews, Jan. 2008, 14 pages.
Czarnecki et al., "Sobolev training for neural networks," Advances in Neural Information Processing Systems, Dec. 2017, 10 pages.
Ding et al., "Learning reduced-order feedback policies for motion skills," Proceedings of the 14th ACM SIGGRAPH/Eurographics Symposium on Computer Animation, Aug. 2015, 10 pages.
Duan et al., "One-shot imitation learning," Advances in neural information processing systems, Dec. 2017, 12 pages.
Furlanello et al., "Born again neural networks," arXiv, Jun. 2018, 10 pages.
Graziano, "The organization of behavioral repertoire in motor cortex," Annual Review of Neuroscience, Jul. 2006, 16 pages.
Heess et al., "Emergence of locomotion behaviours in rich environments," arXiv, Jul. 2017, 14 pages.
Heess et al., "Learning continuous control policies by stochastic value gradients," Advances in Neural Information Processing Systems, Dec. 2015, 9 pages.
Hinton et al., "Distilling the knowledge in a neural network," arXiv, Mar. 2015, 9 pages.
Kingma et al., "Adam: A method for stochastic optimization," arXiv, Dec. 2014, 15 pages.
Kingma et al., "Auto-encoding variational bayes," arXiv, May 2014, 14 pages.
Laskey et al., "Dart: Noise injection for robust imitation learning," arXiv, Oct. 2017, 14 pages.
Liu et al., "Learning basketball dribbling skills using trajectory optimization and deep reinforcement learning," ACM Transactions on Graphics, Jul. 2018, 14 pages.
Liu et al., "Sampling-based contact-rich motion control," ACM Transactions on Graphics, Jul. 2010, 10 pages.
Meier, "A probabilistic representation for dynamic movement primitives," arXiv, Dec. 2016, 5 pages.
Merel et al., "Hierarchical visuomotor control of humanoids," arXiv, Jan. 2019, 19 pages.
Merel et al., "Learning human behaviors from motion capture by adversarial imitation," arXiv, Jul. 2017, 12 pages.
Mordatch et al., "Interactive control of diverse complex characters with neural networks," Advances in Neural Information Processing Systems, Dec. 2015, 9 pages.
Morimoto et al., "Minimax differential dynamic programming: An application to robust biped walking," Advances in neural information processing systems, 8 pages.
Munos et al., "Safe and efficient off-policy reinforcement learning," Advances in Neural Information Processing Systems, Dec. 2016, 9 pages.
Neumann et al., "Learning modular policies for robotics," Frontiers in computational neuroscience, Jun. 2014, 13 pages.
Paraschos et al., "Probabilistic movement primitives," Advances in neural information processing systems, Dec. 2015, 9 pages.
Parisotto et al., "Actor-mimic: Deep multitask and transfer reinforcement learning," arXiv, Feb. 2016, 16 pages.
Peng et al., "Deeploco: Dynamic locomotion skills using hierarchical deep reinforcement learning," ACM Transactions on Graphics, Jul. 2017, 16 pages.
Rezende et al., "Stochastic Backpropagation and Approximate Inference in Deep Generative Models," arXiv, May 2014, 14 pages.
Ross et al., "A reduction of imitation learning and structured prediction to no-regret online learning," arXiv, Mar. 2011, 9 pages.
Rusu et al., "Policy distillation," arXiv, Jan. 2016, 13 pages.
Schaal et al., "Learning movement primitives," Robotics research. The eleventh international symposium, Feb. 2005, 8 pages.
Schulman et al., "Trust region policy optimization," International conference on machine learning, Jun. 2015, 9 pages.
Srinivas et al., "Knowledge transfer with jacobian matching," arXiv, Mar. 2018, 11 pages.
Tassa et al., "Control-limited differential dynamic programming," 2014 IEEE International Conference on Robotics and Automation (ICRA), May 2014, 8 pages.

(56) References Cited

OTHER PUBLICATIONS

Tassa et al., "Synthesis and stabilization of complex behaviors through online trajectory optimization," 2012 IEEE/RSJ International Conference on Intelligent Robots and Systems, Oct. 2012, 8 pages.
Tedrake, "LQR-trees: Feedback motion planning on sparse randomized trees," MIT Press, Jun. 2009, 8 pages.
Teh et al., "Distral: Robust multitask reinforcement learning," Advances in Neural Information Processing Systems, Dec. 2017, 11 pages.
Todorov et al., "Mujoco: A physics engine for model-based control," 2012 IEEE/RSJ International Conference on Intelligent Robots and Systems, Oct. 2012, 8 pages.
Todorov et al., "Unsupervised learning of sensory-motor primitives," In Proceedings of the 25th Annual International Conference of the IEEE Engineering in Medicine and Biology Society, IEEE, Sep. 2003, 4 pages.
Vincent et al., "Extracting and composing robust features with denoising autoencoders," Proceedings of the 25th international conference on Machine learning, Jul. 2008, 8 pages.
Wang et al., "Robust imitation of diverse behaviors," Advances in Neural Information Processing Systems, Dec. 2017, 10 pages.
Xue et al., "Deepmimic: Example-guided deep reinforcement learning of physics-based character skills," arXiv, Jul. 2018, 18 pages.
Finn, "Learning to Learn with Gradients," Aug. 2018, retrieved on Jan. 10, 2019, retrieved from URL <https://escholarship.org/content/qt0987d4n3/qt0987d4n3.pdf>, 199 pages.
Haarnoja et al., "Latent Space Policies for Hierarchical Reinforcement Learning," https://arxiv.org/abs/1804.02808, last revised Sep. 2018, 11 pages.
Levine et al., "Learning Neural Network Policies with Guided Policy Search under Unknown Dynamics", Proceedings of the 27th Conference on Advances in Neural Information Processing Systems, Dec. 2014, 11 pages.
Merel et al., "Neural probabilistic motor primitives for humanoid control," https://arxiv.org/abs/1811.11711v1, Nov. 2018, 14 pages.
PCT International Search Report and Written Opinion in International Appln. No. PCT/EP2019/076163, dated Dec. 20, 2019, 24 pages.
Pereida et al., "Data-Efficient Multi-Robot, Multi-Task Transfer Learning for Trajectory Tracking," https://arxiv.org/abs/1709.04543, last revised Apr. 2018, 9 pages.
PCT International Preliminary Report on Patentability in International Appln. No. PCT/EP2019/076163, dated Apr. 8, 2021, 19 pages.

* cited by examiner

LEARNING MOTOR PRIMITIVES AND TRAINING A MACHINE LEARNING SYSTEM USING A LINEAR-FEEDBACK-STABILIZED POLICY

CROSS-REFERENCE TO RELATED APPLICATION

This application claims priority to U.S. Provisional Application No. 62/737,816, filed on Sep. 27, 2018. The disclosure of the prior application is considered part of and is incorporated by reference in the disclosure of this application.

BACKGROUND

This specification generally relates to systems and methods for transferring knowledge from one or more experts to a student machine learning computer system.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

Some neural networks are recurrent neural networks. A recurrent neural network is a neural network that receives an input sequence and generates an output sequence from the input sequence. In particular, a recurrent neural network can use some or all of the internal state of the network from a previous time step in computing an output at a current time step. An example of a recurrent neural network is a long short term (LSTM) neural network that includes one or more LSTM memory blocks. Each LSTM memory block can include one or more cells that each include an input gate, a forget gate, and an output gate that allow the cell to store previous states for the cell, e.g., for use in generating a current activation or to be provided to other components of the LSTM neural network.

Neural networks can be used in various ways. For example, neural networks are often used as part of a reinforcement learning system in which an agent interacts with an environment by performing actions that are selected by the reinforcement learning system in response to receiving observations that characterize the current state of the agent and/or environment.

Some reinforcement learning systems select the action to be performed by the agent in response to receiving a given observation in accordance with an output of a neural network.

SUMMARY

This specification describes methods and systems implemented as computer programs on one or more computers in one or more locations that are able to learn motor primitives for agent control, e.g. robotic/humanoid agent control. Some implementations are able to perform one-shot imitation of previously unseen whole body humanoid behavior. As used herein a motor primitive can refer to a reusable learned embedding space which is capable of generating sensory-feedback stabilized motor behaviour when executed in an environment. A state as described herein may comprise a sensed state of the agent and/or an environment of the agent.

In one aspect a computer-implemented method of training a student machine learning system comprises receiving data indicating execution of an expert, determining one or more actions performed by the expert during the execution and a corresponding state-action Jacobian, and training the student machine learning system using a linear-feedback-stabilized policy. The linear-feedback-stabilized policy may be based on the state-action Jacobian. The student machine learning system may be referred to herein simply as a student. The expert may be a trained computer system e.g. a trained neural network or computer program comprising one or more behaviour policies, or a human expert. Thus the expert may be or may be based on a human or humanoid, or even animal expert.

Examples of the methods, and corresponding systems, described herein can address a broad challenge in machine learning for control and robotics which is to produce policies capable of general, flexible, and adaptive behaviour of complex, physical bodies. Examples of the methods of systems can build policies that can effectively control simulated bodies (for example, humanoid or animal bodies), overcoming challenges related to high-dimensional control, body balance, and locomotion.

Motion capture data of humanoids is widely available; motion capture data of other motion may be similarly obtained. These facilitate the production of highly specialized expert policies which robustly, albeit narrowly, reproduce single motion capture clips. Examples of the methods and systems described herein address a remaining challenge for flexible and general purpose control by enabling the sequencing and generalization of individual skills in a task-directed manner. In implementations achieving this goal uses an ability to acquire individual skills and also an architecture and associated training procedure that then allows representation, recruitment, and composing such a large number of skills in a robust manner with little additional tuning. Examples of the methods and systems described herein allow for the transfer of functional properties from one or multiple expert policies to another control system policy, such as a student policy. Examples of the methods and systems described herein are able to transfer the expert behaviour and also its ability to recover from perturbations.

The student machine learning system may be a machine learning system that is configured to imitate the expert and/or a plurality of experts. The state-action Jacobian (e.g. the Jacobian matrix of all first order partial derivatives for the vector-valued function defined by the expert policy) can be used to construct a linear feedback controller which gives target actions in nearby perturbed states during training.

The actions may relate to behaviour. Particularly, the actions may relate to locomotion behaviour. For example, the actions may comprise motor primitives. A motor primitive reflects a context triggered execution of a self-stabilized motor pattern (i.e. a robust policy execution in an environment). The experts may have been trained to reproduce motor primitives observed from single clips of humanoids. The experts may comprise single-skill time-indexed policies. In such cases, the experts can be conceptualized as nonlinear feedback regulators around a nominal trajectory (e.g. mean trajectory), and the manifold of states visited by experts can be thought of as a tube around that reference. Advantageously, the student trained using the above method is able to operate successfully in and remain close to this tube even in the face of small perturbations.

The monitoring may comprise monitoring motion capture data of an agent moving under the control of the expert. For example, the monitoring may comprise monitoring the state of a robot under the control of an expert as a function of time.

Receiving data indicating execution of the expert may comprise executing the expert a single time along a representative nominal trajectory, and logging the expert's action and state-action Jacobian. That is, the execution may be carried out and the state-action Jacobian logged along a single rollout, e.g. carried out once. Advantageously, the method negates the need to perform multiple rollouts, which can be costly and time consuming.

The execution may be carried out without action noise.

Training the student using the linear-feedback-stabilized policy may comprise minimising over the expected distance between expert actions in a perturbed state and student actions in the perturbed state, wherein the expert actions in the perturbed state are linearly approximated using the state action Jacobian. Beneficially, the Jacobian-based linear-feedback policy is available offline.

The linear-feedback-stabilized policy may comprise a linear approximation to the experts actions. Given an expert policy, the mean action of the expert in state s may be written as $\mu_E(s)$. The nominal trajectory of a policy refers to the sequence of nominal state action pairs $\{s^*_t, a^*_t\}_{1 \ldots T}$ obtained by executing $\mu_E(s)$ (the mean action of the expert in state s) recursively from an initial point $s^*_0$. The expert's open-loop policy refers to the policy which blindly executes the time-indexed sequence of nominal actions. Experts trained to reproduce single clips robustly can be thought of as nonlinear feedback controllers around a nominal trajectory. In order to linearize the expert policy, $\delta s$ is taken as a small perturbation of the state and the state action Jacobian may be given by:

$$J = \frac{d\mu_E(s)}{ds}\bigg|_{s=s}$$

Then an action of the expert in a perturbed state is given by:

$$\mu_E(s+\delta s) = \mu_E(s) + J\delta s + 0(\|\delta s\|^2)$$

This linearization induces a linear-feedback-stabilized policy that at each time-step has a nominal action $a^*_t$, but also expects to be in state $s^*_t$, and correspondingly amends the nominal action with a linear perturbation based on discrepancy between the nominal and actual state at time t. That is, the linear-feedback-stabilized policy may be given by:

$$\mu_{FB}(s_t) = a^*_t + J^*_t(s_t - s^*_t)$$

Where, $$J^*_t = \frac{d\mu_E(s)}{ds}\bigg|_{s=s^*_t}$$

A policy known herein as linear-feedback policy cloning (LFPC), described below, may be used to ensure that the student retains expert robustness properties. Behavioural cloning may refer to the optimization of:

$$\min_\theta \mathbb{E}_{s \sim \rho_E}[(\mu_E(s) - \mu_\theta(s))^2]$$

Where $\rho_E$, plausible (noisy) expert state distribution, is replaced with an empirical distribution of a (typically fixed) set of state-action pairs S. This works well if the set of states S adequately covers the state distribution later experienced by the student. However, anticipating and generating an appropriate set of states on which to train the student typically requires rollouts and can thus be expensive. In the case above where the expert is presented as a feedback controller operating in a tube around some nominal trajectory S, to capture the expert's robustness to perturbations s a distribution of states around a nominal trajectory may be captured, where the distribution of states is defined by:

$$\min_\theta \frac{1}{T} \sum_i \mathbb{E}_{\delta s_i \sim \Delta(s)}[\|\mu_E(s_i + \delta s_i) - \mu_\theta(s_i + \delta s_i)\|^2]$$

According to LFPC, we can replace the expert action $\mu_E(s+\delta s)$ with the Jacobian-based linear-feedback policy, $\mu_{FB}(s+\delta s)$, which is available offline, and, for an appropriate choice of (in some implementations, state-dependent) perturbation distribution $\Delta(s)$ an approximation is given by:

$$\min_\theta \frac{1}{T} \sum_i \mathbb{E}_{\delta s_i \sim \Delta(s)}[\|\mu_\theta(s^*_i + \delta s_i) - a^*_i - J^*_i \delta s_i\|^2_2]$$

Ideally, $\Delta(s)$, which is the state-dependent distribution, would be induced by physically plausible transitions. However, estimating this distribution may require potentially expensive rollouts. A more efficient method is to estimate the stationary transition noise distribution induced by noisy actions, which can be efficiently approximated from a small number of trajectories.

LFPC may be viewed as a data augmentation method; the approach attempts to match the mean action as well as the Jacobian at the set of points sampled along the nominal trajectory.

Determining the expert actions in the perturbed state may comprise amending a nominal action with a linear perturbation based on a difference between a nominal state and an actual state at a given time.

The student machine learning system may be used as a controller to control an agent interacting with an environment. In order for the agent to interact with the environment, the system receives data characterizing the current state of the environment and/or of the agent and selects an action to be performed by the agent in response to the received data.

In some implementations, the environment is a real-world environment and the agent is a mechanical agent interacting with the real-world environment. For example, the agent may be a robot (or part of a robot such as a robotic limb or appendage) interacting with the environment to accomplish a specific task, e.g., to locate an object of interest in the environment or to move an object of interest to a specified location in the environment; or the agent may be an autonomous or semi-autonomous land or air vehicle navigating through the environment.

Data characterizing a state of the agent and or environment may be referred to as an observation. The observations may define a state of the agent. The observations may include, for example, one or more of images, object position data, and sensor data to capture observations as the agent as it interacts with the environment, for example sensor data from an image, distance, or position sensor or from an actuator. In these implementations, the actions may be control inputs to control the robot or the autonomous or semi-autonomous land or air vehicle.

For example in the case of a robot the observations may comprise one or more of: joint position, joint velocity, joint force, torque or acceleration, for example gravity-compensated torque feedback, and global or relative pose of an item held by the robot.

In the case of a robot or other mechanical agent or vehicle the observations may similarly comprise one or more of the position, linear or angular velocity, force, torque or acceleration, and global or relative pose of one or more parts of the agent. The observations may be defined in 1, 2 or 3 dimensions, and may be absolute and/or relative observations.

The observations may also include, for example, sensed electronic signals such as motor current or a temperature signal; and/or image or video data for example from a camera or a LIDAR sensor.

In the case of an electronic agent the observations may comprise data from one or more sensors monitoring part of a plant or service facility such as current, voltage, power, temperature and other sensors and/or electronic signals representing the functioning of electronic and/or mechanical items of equipment.

Action data from a continuous action space may comprise, for example, position, velocity, or force/torque/acceleration data for one or more joints of a robot or parts of another mechanical agent. Action data may additionally or alternatively comprise electronic control data such as motor control data, or more generally data for controlling one or more electronic devices within the environment the control of which has an effect on the observed state of the environment. For example in the case of an autonomous or semi-autonomous land or air vehicle the actions may comprise actions to control navigation e.g. steering, and movement e.g., braking and/or acceleration of the vehicle.

In some implementations the environment is a simulated environment and the agent is implemented as one or more computers interacting with the simulated environment.

For example the simulated environment may be a simulation of a robot or vehicle and the reinforcement learning system may be trained on the simulation. For example, the simulated environment may be a motion simulation environment, e.g., a driving simulation or a flight simulation, and the agent is a simulated vehicle navigating through the motion simulation. In these implementations, the actions may be control inputs to control the simulated user or simulated vehicle.

In another example, the simulated environment may be a video game and the agent may be a simulated user playing the video game.

Advantageously, LFPC can be used in settings where rollouts are costly to obtain, such as real-world robots.

In another aspect, a neural network architecture, implemented by one or more computers, comprises an encoder configured to generate latent variables based on an input comprising a plurality of frames, and a decoder configured to generate an action based on one or more of the latent variables and a state. Advantageously, the neural network does not just reproduce individual behaviors in the training data, but allows sequencing and composing these behaviors in a controlled fashion, and can synthesize novel movements consistent with the distribution of data it was trained on. The plurality of frames of each input represent a trajectory of motion. For example, the frames may be image frames, but may comprise an alternative representation.

The encoder may define a distribution $q(z_t|x_t)$, where $x_t$ is an input comprising a plurality of observations e.g. image frames and may include a number of future state observations e.g. image frames $x_t=[s_{t+1}, \ldots, s_{t+K}]$, and $z_t$ is a latent variable. That is, the neural network may be thought of as a latent variable model with one latent variable $z_t$ per time step, modelling the state conditional action distribution. The encoder may be implemented as a neural network. The encoder may be a two-layer multilayer perceptron (MLP) with K frames of the future trajectory being concatenated at the input.

The decoder may define a distribution $\pi(a_t|z_t, s_t)$, where $a_t$ is the action. The decoder may be implemented as a neural network. The decoder may be an MLP with three hidden layers that concatenates the state $s_t$ and the latent variable $z_t$.

In an implementation, the generative part of the neural network may be described as:

$$p(a_{1:T}, z_{1:T} | s_{1:T}) = \prod_{t=1}^{T} p(z_t | z_{t-1})\pi(a_t | z_t, s_t)$$

The neural network may comprise an autoregressive latent variable model.

The neural network may be trained using an AR(1) process.

Temporally nearby trajectory snippets should have a similar representation in the latent space. Therefore, using an AR(1) process, where, in an implementation a weak prior of $z_t = \alpha z_{t-1} + \sigma \epsilon$, $\epsilon \sim \mathcal{N}(0, 1)$ is used, where $\sigma = \sqrt{1-\alpha^2}$, ensures that marginally, $z_t \sim \mathcal{N}(0, 1)$. $\alpha$ may be any suitable value, such as, for example 0:95. In this way, temporal correlations can be modelled in the latent variable.

Advantageously, the neural network effectively implements a conditional information bottleneck between a desired future trajectory $x_t$ and the action given the past latent state $z_{t-1}$. The auto-correlated prior encourages an encoding in which temporally nearby latent states from the same trajectory tend to be close in the representation space, and the information bottleneck more generally encourages a limited dependence on $x_t$ with $z_t$ forming a compressed representation of the future trajectory as required for the action choice.

The neural network may be trained based on an evidence lower bound. In an implementation the evidence lower bound may be given by:

$$\mathbb{E}_q\left[\sum_{t}^{T} \log \pi(a_t | s_t, z_t) + \beta(\log p_z(z_t | z_{t-1}) - \log q(z_t | z_{t-1}, x_t))\right]$$

where $\beta$ may be used to tune the weight of the prior. This objective can be optimized using supervised learning (i.e. behavioural cloning from noisy rollouts) offline. However, in a particular implementation, the objective can be adapted for use with LFPC as described above, to give:

$$\mathbb{E}_{\delta s, q}\left[\sum_{t=1}^{T} \log \pi(a_t + J_t \delta s_t | s_t + \delta s_t, z_t) + \right.$$

$$\left. \beta(\log p_z(z_t | z_{t-1}) - \log q(z_t | z_{t-1}, x_t + \delta x_t))\right]$$

where $\delta x_t$ is a set of concatenated independent samples $[\delta s_t, \delta s_{t+1}, \ldots, \delta s_{t+K}]$ and $\delta s_t$ are perturbations drawn from a perturbation distribution $\Delta(s)$.

The evidence based lower bound may be approximated using a state-action Jacobian.

The state-action Jacobian may be determined as described above. For example, the state-action Jacobian may be based on executing experts once along a representative nominal trajectory without action noise, and logging the expert action and state-action Jacobian.

The neural network may further comprise a motor representation space configured to store latent variables output by the encoder. In this way, many expert policies may be compressed and stored for subsequent use by the decoder. Once trained, the motor representation space and the decoder may be used without the encoder. For example, for a given observed input state $s_t$, the decoder may sample relevant stored latent variables from the motor representation space so as to decode an action that can be performed based on the observed input state. In this way, one-shot imitation may be carried out based on observing, for example, a movement.

Advantageously, once trained, the decoder provides a motor primitive module that can flexibly and robustly deploy, sequence, and interpolate a diverse set of skills from a large database of reference trajectories without any manual alignment or other processing of the raw experts. The decoder provides a representation that does not just reliably encode all behavioural modes but also allows effective indexing of behaviours for recall. To ensure plausible and reliable transitions the encoding of similar behaviours are also close in the representation space. The representation space may be used to classify gestures so as to allow for gesture control of systems and or agents.

In another aspect, the decoder of any one of the above described neural network is used to control an object. The object may be a robot or part of a robot such as a robotic limb or appendage. The object may be an object in an industrial facility. The object may be a video game character, avatar, or animation. The object may be a vehicle, such as an autonomous vehicle. Controlling an object may comprise a locomotive control. For example, in the case where the object is a robot, the decoder may be used to control the robot to walk, run, turn, jump, dance, swing and carry out similar known locomotive actions.

The method may further comprise controlling the object using the motor representation space in combination with the decoder.

In an aspect, a method of training an neural network comprises monitoring an execution of an expert to determine one or more actions performed by the expert and a corresponding a state action Jacobian; and training the neural network using a linear-feedback-stabilized policy, the linear-feedback-stabilized policy being based on the state action Jacobian.

In another aspect there is provided a method of encoding behaviours for recall, in particular by generating actions for a behaviour. In implementations the recall is typically not exact but the actions, when performed, implement a behaviour which is similar to an example of a learned behaviour.

In implementations the method may comprise inputting an observation comprising a set of one or more image frames for an example behaviour at a time step. The method may further comprise encoding the observation using an encoder neural network to determine parameters of a first, posterior distribution of a set of motor primitive latent variables. The set of motor primitive latent variables may define an embedding of the example behaviour. The method may further comprise sampling from the posterior distribution to determine a set of motor primitive latent variables. The method may further comprise decoding the set of motor primitive latent variables using a generative neural network conditioned on the set of motor primitive latent variables to generate action data for the time step. The method may further comprise training parameters of the encoder neural network and of the generative neural network using an objective function dependent upon the action data and upon data representing actions corresponding to the example behaviour.

Typically many example expert behaviours may be encoded in the system. An observation may comprise one or a few, e.g. concatenated, image frames, for example a current frame and zero, one or more future image frames.

The method may effectively perform one-shot learning by encoding a new, target behaviour in the same way: for successive observations of the target behaviour generating parameters defining a distribution for a set of motor primitive latent variables, sampling from the distribution, and then generating an output from the generative neural network which may define the action, either directly, for example as a continuous variable defining the action value or e.g. as a maximum score from an output of a set of outputs corresponding to a set of possible actions, or as providing parameters of a distribution over actions, from which an action may be sampled. In this way a time sequence of actions for the target behaviour may be generated.

In some implementations the objective function may include a term dependent upon a difference between the posterior distribution and a prior distribution for the motor primitive latent variables. The prior distribution may comprises an autoregressive distribution, for example such that at each time step the prior distribution depends on a combination of a times the prior distribution at a previous time step where $|\alpha|<1$, and a noise component. This allows temporal correlation to be encoded in the prior; larger values of a corresponding to greater temporal correlation. A value for a may be selected according to the nature of the behaviour.

In some implementations the method further comprises conditioning the generative neural network at the time step on a lookahead portion of a state-action trajectory of the example behaviour for one or more time steps in the future for the time step.

The method may be used for learning to select actions to be performed by an agent in an environment for performing a task by using the generative neural network to generate sequences of actions for motor primitives. In broad terms the method may employ a reinforcement learning technique to learn to perform the task using the learned motor primitives, that is by providing an action output defining (using the learned, motor primitive embedding space) sequences of actions corresponding to the motor primitives rather than by learning to defining the individual actions.

Thus a method may comprise receiving an observation characterizing a state of one or both of the agent and the environment. The method may further comprise processing the observation using an action selection neural network system to generate the set of motor primitive latent variables, wherein the set of motor primitive latent variables characterizes a motor primitive. The set of latent variables may be static for a sequence of actions or may evolve e.g. guided by an autoregressive prior.

The method may further comprise processing, for each of a sequence to time steps, the set of motor primitive latent variables and an observation of a state of the agent to generate action data for each of the time steps for selecting actions to be performed by the agent at each of the time steps.

The method may further comprise adjusting parameters of the action selection neural network system in response to a return from one or both of the agent and the environment. The adjusting may be performed using e.g. any reinforcement learning technique, e.g. to backpropagate gradients of a reinforcement learning objective function. The parameters may be adjusted at every time step or at longer intervals, e.g. after every sequence of time steps. The return may comprise a cumulative measure of reward received e.g. by or from the agent or environment, for example, a time-discounted sum of rewards.

There are also provided a corresponding systems to the above described methods.

For example a system may comprise a (trained) generative neural network as described above, for learning to select actions to be performed by an agent in an environment for performing a task. Such a system may be configured to use the generative neural network to generate sequences of actions for motor primitives Such a system may comprise an input to receive an observation characterizing a state of one or both of the agent and the environment. The system may further comprise an action selection neural network system configured to process the observation to generate the set of motor primitive latent variables, wherein the set of motor primitive latent variables characterizes a motor primitive. The generative neural network may be configured to, for each of a sequence to time steps, process the set of motor primitive latent variables and an observation of a state of the agent to generate action data for each of the time steps for selecting actions to be performed by the agent at each of the time steps.

The system may be used after training to select actions to perform the task, or the system may be used to learn a task. Thus the system may further comprise a training subsystem configured to adjust parameters of the action selection neural network system in response to a return from one or both of the agent and the environment.

Features of one aspect may be combined with features of other aspects of the disclosed subject matter where appropriate.

The subject matter described in this specification can be implemented in particular embodiments so as to realize one or more of the following advantages.

Functional properties of an expert policy may be transferred to a student policy without having to engage in RL-style closed-loop training. Being able to avoid closed-loop RL training provides efficient processing and allows the method to work with a large number of skills at the same time. The avoidance of closed-loop RL training allows for training of the student machine-learning system more quickly and with fewer computational, memory and energy resources.

Examples of the method are convenient to implement in a regular supervised learning pipeline and avoid queries of the expert, which may require expensive network evaluations, or execution of the student at training time.

BRIEF DESCRIPTION OF DRAWINGS

Embodiments of the invention will now be described, by way of example, with reference to the accompanying drawings, in which.

Like reference numbers and designations in the various drawings indicate like elements.

DETAILED DESCRIPTION

A broad challenge in machine learning for control and robotics is to produce policies capable of general, flexible, and adaptive behavior of complex, physical bodies. To build policies that can effectively control simulated humanoid bodies, foundational challenges related to high-dimensional control, body balance, and locomotion must simultaneously be overcome.

The present specification describes a method of training a student policy (student) based on the observations of an expert policy (expert). Additionally, the specification describes a method of producing, and using, a single trained motor architecture which can execute and reuse motor skills of a large, diverse set of experts with minimal manual segmentation or curation.

Expert policies are policies which can robustly reproduce a single motion capture clip. For example, the expert may be based on a human or humanoid expert that is walking, running, lifting, catching, etc. When transferring knowledge from an expert to a student, the goal is for the student to replicate the expert's behavior in the full set of states plausibly visited by the expert. Experts trained to reproduce single clips can be conceptualized as nonlinear feedback controllers around a nominal trajectory, and the manifold of states visited by experts can be thought of as a tube around that reference. Ideally, the student is to be able to operate successfully in and remain close to this tube even in the face of small perturbations.

A method for transferring knowledge from an expert to a student will now be described. The method of transfer is referred herein as Linear Feedback Stabilized Policy, or Linear Feedback Policy Cloning (LFPC). Advantageously, LFPC is able to perform as well as behavioral cloning methods while using considerably fewer expert rollouts.

The LFPC uses a state-action Jacobian (e.g. the Jacobian matrix of all first order partial derivatives for the vector-valued function defined by the expert policy) to construct a linear feedback controller which gives target actions in nearby perturbed states during training, which is described in further detail below.

The actions may relate to behaviour, such as locomotion behaviour. For example, the actions may comprise motor primitives. The experts may have been trained to reproduce motor primitives observed from single clips of humanoids. The experts may comprise single-skill time-indexed policies. In such cases, the experts can be conceptualized as nonlinear feedback regulators around a nominal trajectory (e.g. mean trajectory), and the manifold of states visited by experts can be thought of as a tube around that reference.

The nominal trajectory of a policy refers to the sequence of nominal state-action pairs $\{s^*_t, a^*_t\}_{1 \ldots T}$ obtained by executing $\mu_E(s)$ (the mean action of the expert in state s) recursively from an initial point $s^*_0$.

In order to linearize the expert policy, $\delta s$ is taken as a small perturbation of the state and the state action Jacobian may be given by:

$$J = \frac{d\mu_E(s)}{ds}\bigg|_{s=s}$$

Then an action of the expert in a perturbed state is given by:

$$\mu_E(s+\delta s) = \mu_E(s) + J\delta s + O(\|\delta s\|^2)$$

This linearization induces a linear-feedback-stabilized policy that at each time-step has a nominal action $a^*_t$, but also expects to be in state $s^*_t$, and correspondingly amends the nominal action with a linear perturbation based on discrepancy between the nominal and actual state at time t. That is, the linear-feedback-stabilized policy may be given by:

$$\mu_{FB}(s_t) = a^*_t + J^*_t(s_t - s^*_t)$$

Where, $$J^*_t = \frac{d\mu_E(s)}{ds}\bigg|_{s=s^*_t}$$

To ensure that the student retains expert robustness, we would like expert actions $\mu_E(s)$ and student actions $\mu_\theta(s)$ to be close under a plausible (noisy) expert state distribution $\rho_E$. A surrogate loss used in imitation learning as well as knowledge transfer is the quadratic loss between action:

$$\min_\theta \mathbb{E}_{s \sim \rho_E}[(\mu_E(s) - \mu_\theta(s))^2]$$

Behavioural cloning may refer to the optimization of the above objective, Where $\rho_E$, plausible (noisy) expert state distribution, is replaced with an empirical distribution of a (typically fixed) set of state-action pairs S. This works well if the set of states S adequately covers the state distribution later experienced by the student. However, anticipating and generating an appropriate set of states on which to train the student typically requires rollouts and can thus be expensive. In the case above where the expert is presented as a feedback controller operating in a tube around some nominal trajectory S, with states $s^*_1, \ldots, s^*_T$, actions $a^*_1, \ldots, a^*_T$, and Jacobians $J^*_1, \ldots, J^*_T$, to capture the expert's robustness to perturbations a distribution of states around a nominal trajectory may be captured, where the distribution of states is defined by:

$$\min_\theta \frac{1}{T}\sum_i \mathbb{E}_{\delta s_i \sim \Delta(s)}[\|\mu_E(s_i + \delta s_i) - \mu_\theta(s_i + \delta s_i)\|^2]$$

According to LFPC, we can replace the expert action $\mu_E(s+\delta s)$ with the Jacobian-based linear-feedback policy, $\mu_{FB}(s+\delta s)$, which is available offline, and, for an appropriate choice of (in some implementations, state-dependent) perturbation distribution $\Delta(s)$, the LFPC objective is given by:

$$\min_\theta \frac{1}{T}\sum_i \mathbb{E}_{\delta s_i \sim \Delta(s)}[\|\mu_\theta(s^*_i + \delta s_i) - a^*_i - J^*_i \delta s_i\|^2_2]$$

Ideally, $\Delta(s)$ would be induced by physically plausible transitions. However, estimating this distribution may require potentially expensive rollouts. A more efficient method is to estimate the stationary transition noise distribution induced by noisy actions, which can be efficiently approximated from a small number of trajectories.

Figure 1:
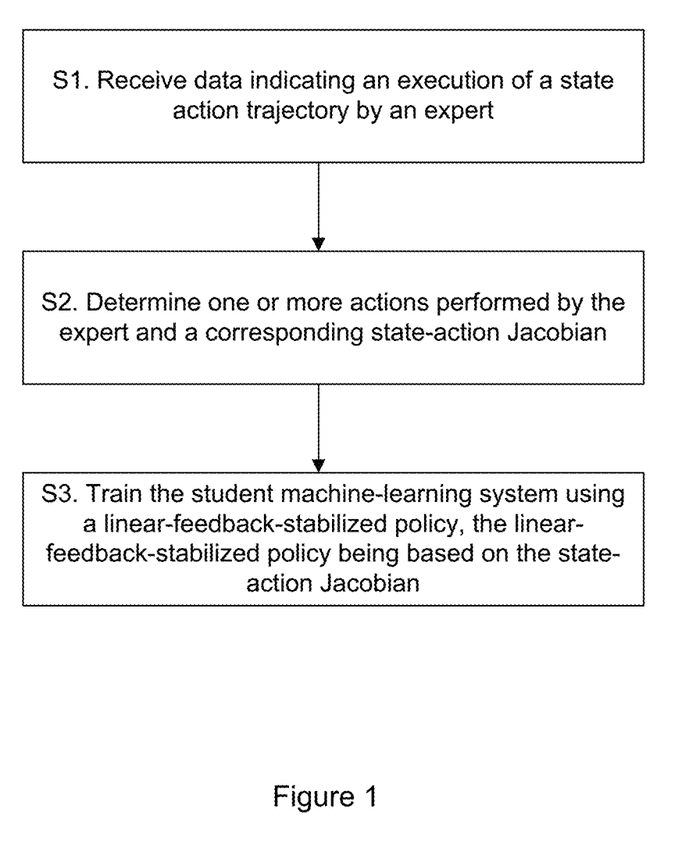
FIG. 1 is a flow diagram of a method of training a student machine learning system.

FIG. 1 shows a flow diagram of a method of training a student machine learning system consistent with the method described above.

At step S1, data is received indicating an execution of a state-action trajectory by an expert.

At step S2, one or more actions performed by the expert during the execution and a corresponding state-action Jacobian are determined.

At step S3, the student machine-learning system is trained using a linear-feedback-stabilized policy, the linear-feedback-stabilized policy being based on the state-action Jacobian.

Figure 2:
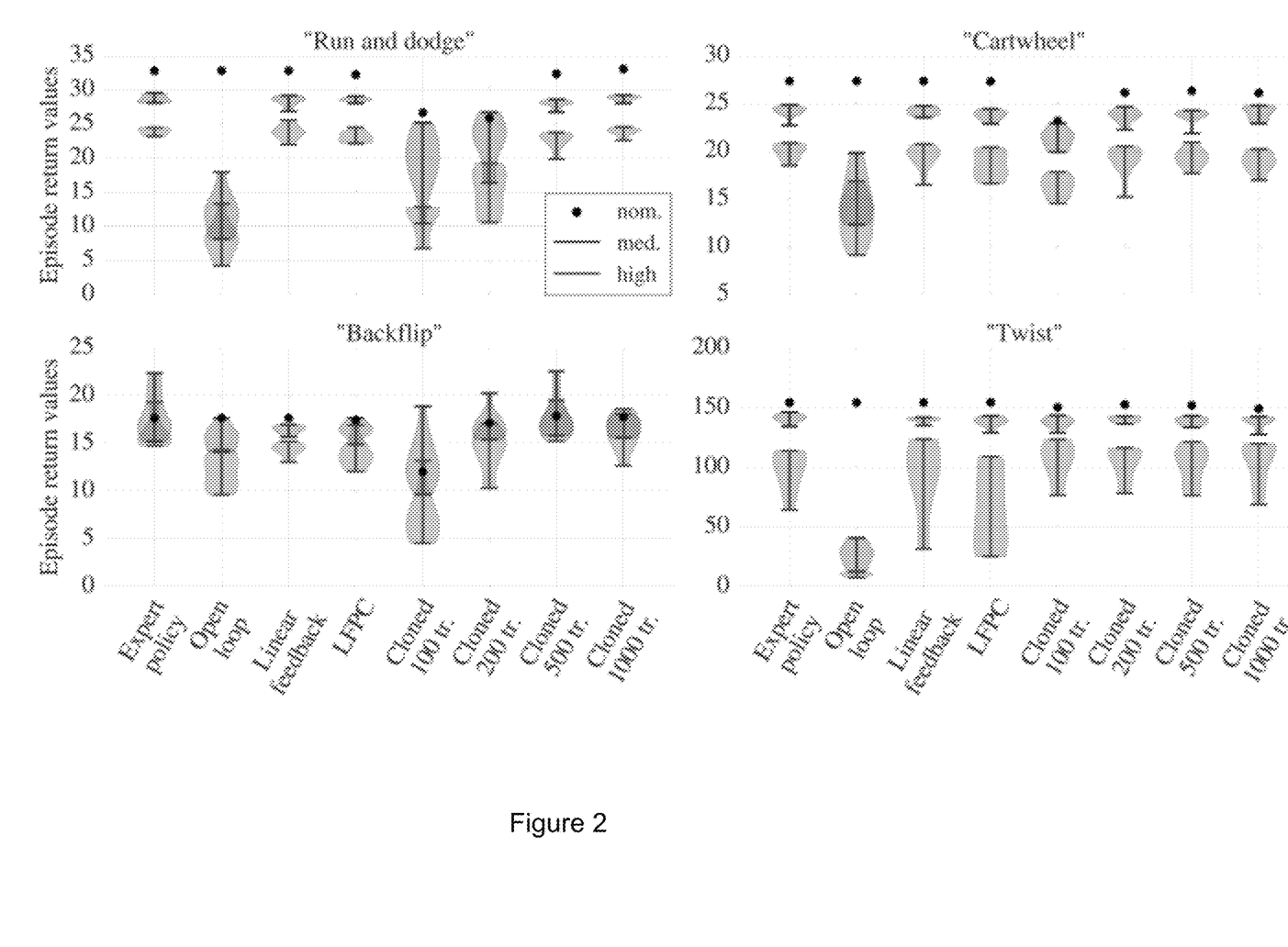
FIG. 2 shows a series of plots highlighting the performance of various methods of knowledge transfer.

LFPC may be considered as a data augmentation method, where the approach attempts to match the mean action as well as the Jacobian at the set of points sampled along the nominal trajectory. FIG. 2 shows a set of results showing the performance of LFPC relative to other methods of knowledge transfer. The results relate to a test in which a single-skill, time-indexed policy is transferred from one network to another. The skills transferred are "run and dodge", "backflip", "cartwheel", and "twist". The comparison is between the original expert policy, an open-loop action sequence along the expert's nominal (i.e. mean) trajectory, a linear feedback policy along the expert nominal trajectory, as well as the network trained to match the linear-feedback behavior (LFPC), as well as policies trained from 100, 200, 500 or 1000 trajectories with behavioural cloning. Each approach is compared with no action noise, small action noise, and moderate action noise (noise is i.i.d. normal per actuator with standard deviation magnitude 0.05 and 0.1 respectively, for action ranges normalized to $[-1, 1]$). Note that, open loop control almost always fails if the state is perturbed by even a small E (though perhaps surprisingly, the backflip can almost be executed open loop due to limited ground contact). As can be seen, LFPC with a single trajectory performs on par with behavioral cloning based on hundreds of trajectories.

Described below is a method which can be used to obtain a motor primitive module that can flexibly and robustly deploy, sequence, and interpolate a diverse set of skills from a large database of reference trajectories without any manual alignment or other processing of the raw experts. The method may be thought of as the compression of many expert skills via a latent variable inverse model. As described below, this is achieved in part by training an autoregressive latent variable model of the state-conditional action sequence which, at training time, is conditioned on short look-ahead snippets of the nominal/reference trajectory. This architecture has the general structure of an inverse model, which produces actions based on the current state and a target. The architecture and training scheme are designed for the embedding space to reflect short-term motor behavior.

Figure 3A:
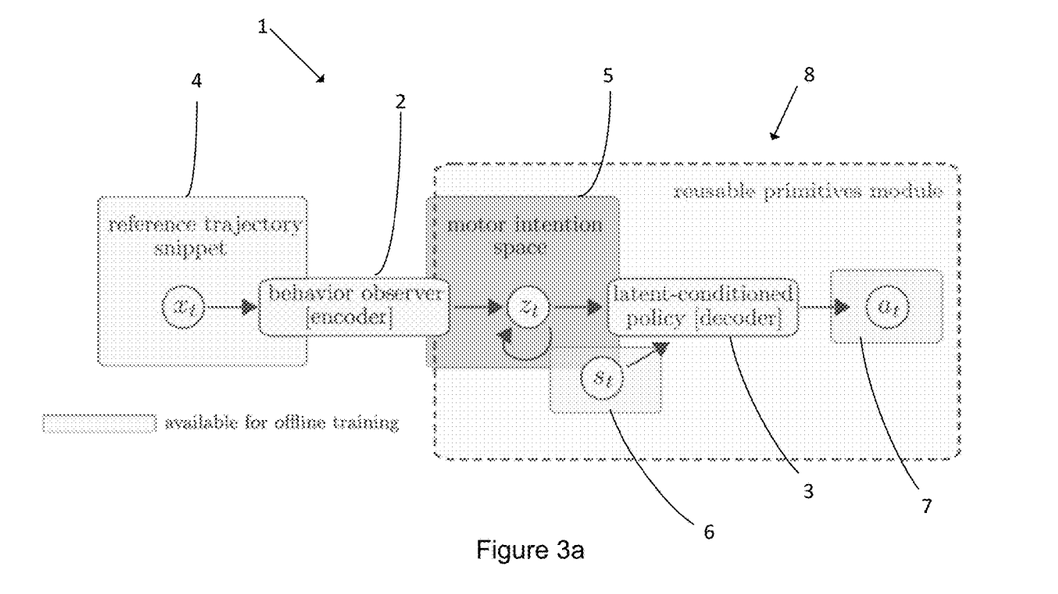
FIG. 3a shows an example neural network system for representing a space of probabilistic motor primitives.

FIG. 3a shows a neural network system 1 for representing a space of probabilistic motor primitives, implemented by one or more computers. The neural network system 1 comprises an encoder 2 and a decoder 3.

The encoder 2 may define a distribution $q(z_t|x_t)$, where $x_t$ is an input comprising a plurality of observations e.g. image frames and may include a number of future state observations e.g. image frames $x_t=[s_{t+1}, \ldots, s_{t+K}]$, i.e. a reference trajectory snippet, and $z_t$ is a (multidimensional) latent variable. That is, the neural network system 1 may be thought of as a latent variable model with one latent variable $z_t$ per time step, modelling the state conditional action distribution. The encoder 2 may be implemented as a neural network. The encoder 2 may be e.g. a two-layer multilayer perceptron (MLP) with K frames of the future trajectory being concatenated at the input. In implementations K<50, 40, 30 20 or 10; e.g. in one implementation K=5. In implementations the encoder neural network 2 processes data from the reference trajectory snippet is processed to obtain parameters defining the posterior distribution $q(z_t|x_t)$, and the multidimensional latent variable $z_t$ may be sampled from this distribution.

The decoder 3 may define a distribution $\pi(a_t|z_t, s_t)$, where $a_t$ is an action in an action space 7, and the distribution is conditioned on a state $s_t$ in a state space 6 and on a latent variable $z_t$ in a motor intention space 5. The decoder 3 may be implemented as a neural network. The decoder may be e.g. an MLP with three hidden layers that concatenates the state $s_t$ and the latent variable $z_t$.

In an implementation, the generative part of the neural network, i.e. a probability distribution for the actions over a time 1 . . . T, may be described as:

$$p(a_{1:T}, z_{1:T}|s_{1:T}) = \prod_{t=1}^{T} p(z_t|z_{t-1})\pi(a_t|z_t, s_t)$$

Here $\pi(a_t|z_t, s_t)$ may be defined by the decoder neural network, which takes as an input a representation of the state (of the agent/environment) at a time step t, e.g. an observation from one or more sensors, and a set of latent variables i.e. multidimensional latent variable $z_t$, for the time step t, and generates an action output for selection an action for the time step. The action output may directly define the action e.g. for a continuous action, or may define a score for selecting an action, or may define parameters of a (multivariate) probability distribution which may be sampled to determine the action. The term $p(z_t|z_{t-1})$ defines a time-dependent prior distribution for the set of latent variables at the time step t.

Temporally nearby trajectory snippets should have a similar representation in the latent space. Therefore temporal correlations may be specified in a prior for the latent variable distribution. For example an autoregressive e.g. AR(1) process may be used. In an implementation a weak prior of $z_t=\alpha z_{t-1}+\sigma\epsilon$, $\epsilon \sim \mathcal{N}(0, 1)$ is used, where $\sigma=\sqrt{1-\alpha^2}$, which ensures that marginally, $z_t \sim \mathcal{N}(0, 1)$; then $p(z_t|z_{t-1})=\mathcal{N}(\alpha z_{t-1}, \sigma)$. The degree of correlation is set by $\alpha$, which may be any suitable value less than 1, such as, for example 0.95 ($\alpha=0$ defines no correlations between time steps).

The neural network system 1 may be trained based on an evidence lower bound. In an implementation the evidence lower bound (ELBO) may be given by:

$$\mathbb{E}_q\left[\sum_{t}^{T} \log \pi(a_t|s_t, z_t) + \beta(\log p_z(z_t|z_{t-1}) - \log q(z_t|z_{t-1}, x_t))\right]$$

where $\beta$ may be used to tune the weight of the prior. That is, $\log(p(a_{1:T}, z_{1:T}|s_{1:T}))$ is equal to or greater than $\mathbb{E}_q[\ldots]$. This objective can be optimized using supervised learning (i.e. behavioural cloning from noisy rollouts) offline. However, in a particular implementation, the objective can be adapted for use with LFPC as described above, to give:

$$\mathbb{E}_{\delta_s,q}\left[\sum_{t=1}^{T} \log \pi(a_t + J_t\delta s_t|s_t + \delta s_t, z_t) + \right.$$
$$\left. \beta(\log p_z(z_t|z_{t-1}) - \log q(z_t|z_{t-1}, x_t + \delta x_t))\right]$$

where $\delta s_t$ are i.i.d. perturbations drawn from suitable perturbation distribution $\Delta$ and $\delta x_t$ is the concatenation of independent samples $[\delta s_t, \delta s_{t+1} \ldots, \delta s_{t+K}]$. For example the perturbation distribution may be a stationary noise distribution e.g. representing state transitions induced by noisy actions. In practice the technique appears robust to variations in the perturbation distribution, and the described techniques will work with a range of different distributions.

The neural network system 1 effectively implements a conditional information bottleneck between a desired future trajectory $x_t$ and the action given the past latent state $z_{t-1}$. The auto-correlated prior encourages an encoding in which temporally nearby latent states from the same trajectory tend to be close in a latent representation space or "motor intention space" 5, and the information bottleneck more generally encourages a limited dependence on $x_t$ with $z_t$ forming a compressed representation of the future trajectory as desired for the action choice. The motor intention space 5 may alternatively be referred to as a motor representation space, or representation space. The motor intention space may comprise a space in which the set of latent vectors is defined i.e. a reusable learned embedding space, which may be used by the decoder to generate sensory-feedback stabilized motor behaviour when executed in an environment. The neural network system 1 may optionally store latent variables output by the encoder 2 i.e. variables defined in the motor intention space 5, e.g. for later reproducing an expert action.

Thus in broad terms neural network system 1 may be considered similar to a variational autoencoder in which the encoder is conditioned on a reference trajectory snippet and the decoder is conditioned on an observation of the state of the agent/environment at time t. An example of a learned expert trajectory may be generated by sampling from the prior latent variable distribution e.g. from the autoregressive AR(1) distribution. Alternatively an example of a learned expert trajectory may be generated by providing the decoder neural network 3 with an example of a sequence of latent variables from an encoded expert trajectory, i.e. conditioning the decoder neural network on the sequence of latent variables, to imitate the expert trajectory (open loop with respect to the latent variables but closed loop with respect to the observed state). The decoder neural network 3 and the associated motor intention space 5, state space 6, and action space 7, may collectively be referred to as a motor primitives module 8.

Figure 3B:
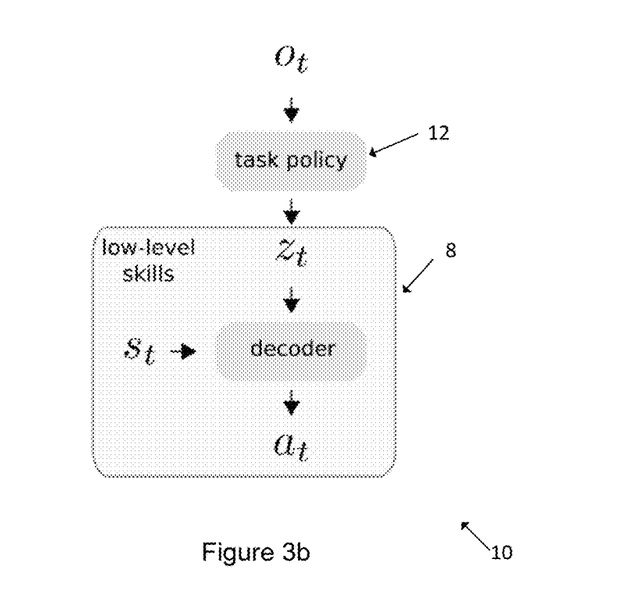
FIG. 3b shows a reinforcement learning system configured to use a motor primitives module of the neural network system of FIG. 3a to learn to perform a task.

FIG. 3b shows a neural network system 10, implemented by one or more computers for learning to perform a task using previously learned probabilistic motor primitives: The motor intention space 5 i.e. the learned embedding space, i.e. the motor primitives module 8 of the neural network system 1, may be used to learn to perform tasks using the learned motor primitives e.g. in a reinforcement learning setting. Thus a reinforcement learning system 12 e.g. an action selection neural network, may learn an action selection policy in which an output of a reinforcement learning action selection neural network is used to select a (multidimensional) latent variable at time t. Thus rather than the action selection neural network being use to directly select an action, the reinforcement learning action selection neural network is used to select a motor primitive which in turn selects a short sequence of actions. That is the motor intention space 5 is the action space of the reinforcement learning action selection neural network, which receives observations $o_t$ of the state of the agent/environment as an input and which generates an output which is used to determine $z_t$, e.g. by outputting $z_t$ or by outputting parameters of a distribution from which $z_t$ is sampled. The latent variable at time t, $z_t$ is then provided as an input to the decoder neural network 3, in combination data from an observation of the state at time t, $s_t$, and the decoder generates an output which is used for selecting an action $a_t$ to be performed by the agent.

Once trained, the decoder 3 provides a motor primitive module that can flexibly and robustly deploy, sequence, and interpolate a diverse set of skills from a large database of reference trajectories without any manual alignment or other processing of the raw experts. The decoder 3 provides a representation that does not just reliably encode all behavioural modes but also allows effective indexing of behaviours for recall. To ensure plausible and reliable transitions the encoding of similar behaviours are also close in the representation space 5.

In some applications, instead of selecting actions the representation space 5, e.g. an output from the encoder neural network 3, may be used to classify observed gestures so as e.g. to allow for gesture control of systems and or agents.

As previously described, the decoder neural network 3 may be used to control an object, such as a robot or part of a robot such as a robotic limb or appendage. The object may be an object in an industrial facility. The object may be a video game character, avatar, or animation. The object may be a vehicle, such as an autonomous vehicle. Controlling an object may comprise a locomotive control. For example, in the case where the object is a robot, the decoder may be used to control the robot to walk, run, turn, jump, dance, swing and carry out similar known locomotive actions.

Thus in some applications the agent is a mechanical agent e.g. a robot e.g. a humanoid robot, the state defines a state of the robot and/or environment, and the actions comprise control commands for the agent. In some applications the agent is a simulated mechanical agent e.g. a simulated robot or a simulated character e.g. an animal or humanoid character. Then the state may define a state of the simulated and/or environment and the actions may comprise control commands, e.g. physics-based control commends, for the agent. Such a simulated agent is useful e.g. for computer games and film animation; and potentially for training a reinforcement learning system which may, after training, act in the real world.

The present disclosure therefore provides a neural network architecture that can represent and generate many motor behaviors (neural probabilistic motor primitives). Once trained, this module does not just reproduce individual behaviors in the training data, but can sequence and compose these behaviors in a controlled fashion as well as synthesize novel movements consistent with the training data distribution.

Figure 4:
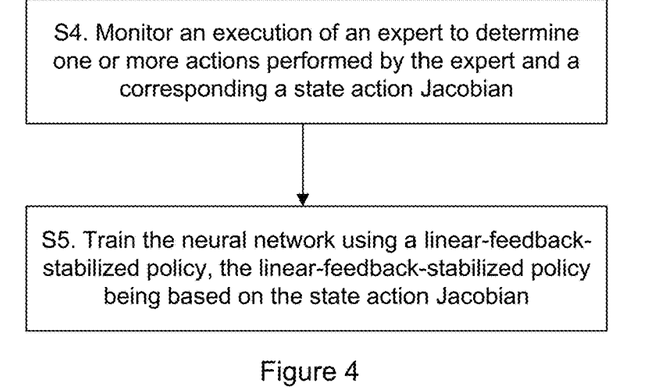
FIG. 4 is a flow diagram of a method of training a neural network.

FIG. 4 is a flow diagram of a method of training a neural network, such as neural network 1.

At step S4 an execution of an expert is monitored to determine one or more actions performed by the expert and a corresponding state action Jacobian;

At step S5 the neural network is trained using a linear-feedback-stabilized policy, the linear-feedback-stabilized policy being based on the state action Jacobian.

Figure 5:
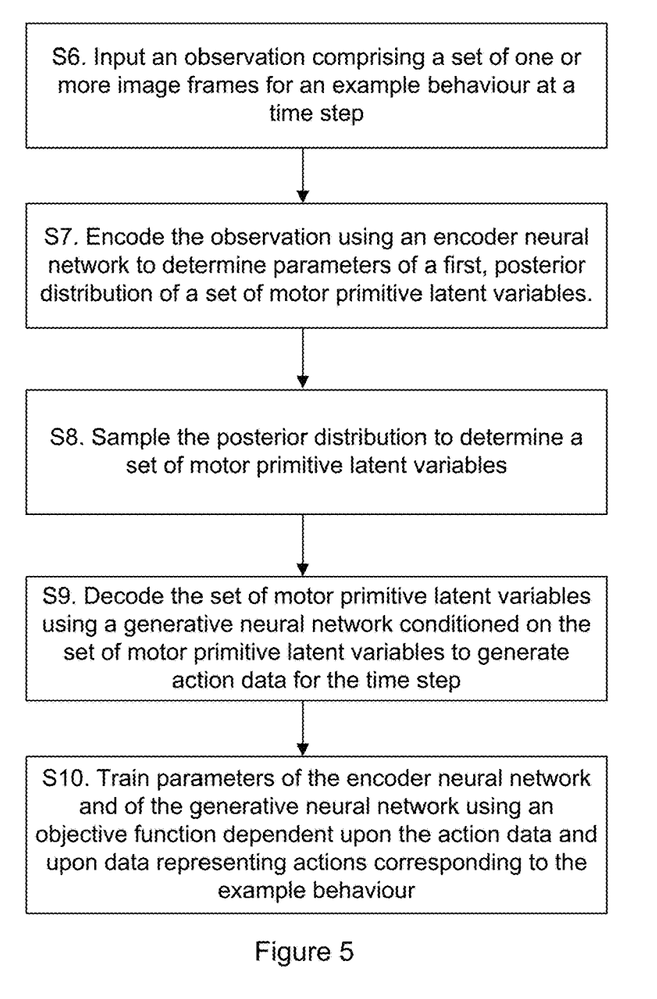
FIG. 5 is a flow diagram of a method of encoding behaviours for recall.

FIG. 5 is a flow diagram of a method of encoding behaviours for recall, which can be used in conjunction with the neural network 1.

At step S6 an observation comprising a set of one or more image frames for an example behaviour at a time step is input.

At step S7 the observation is encoded using an encoder neural network to determine parameters of a first, posterior distribution of a set of motor primitive latent variables, wherein the set of motor primitive latent variables defines an embedding of the example behaviour.

At step S8, the posterior distribution is sampled to determine a set of motor primitive latent variables.

At step S9 the set of motor primitive latent variables is decoded using a generative neural network conditioned on the set of motor primitive latent variables to generate action data for the time step.

At step S10, parameters of the encoder neural network and of the generative neural network are trained e.g. by backpropagating gradients of an objective function dependent upon the action data and upon data representing actions corresponding to the example behaviour. The objective function may be e.g. the previously described ELBO objective function; the expectation value may be taken over one or more training samples.

The gradients may be back-propagated through the generative neural network into the encoder neural network using the "re-parameterization trick" (see, e.g. Kingma and Welling 2013, arXiv1312.6114), in which a sampling node is replaced by a deterministic operation with a noise input to allow a gradient to flow through the node.

The encoder neural network may comprise the encoder 2. The generative neural network may comprise the decoder neural network 3.

The neural network system 1 described above may be used for more complex tasks, which combine locomotion and object manipulation. For example, locomotion may refer to the movement of a robot or virtual robot, having, for example a humanoid composition, and object manipulation may refer to the manipulation (such as movement) of an object or virtual object, by the robot, or virtual robot, and where the object is separate from the robot or virtual robot. For example, the object may be a box, and the robot may be used to pick up the box.

For example, a number of experts may be produced for behaviors such as picking up an object, carrying an object, throwing and/or catching an object, and/or putting down the object. Experts may be produced for different variations of the same task, e.g. putting down or picking up the object at different heights. Experts may be produced for interaction with objects of different specifications, e.g. sizes/weights.

Once a number of experts have been produced, the experts' behaviours may be distilled into a single module (such as the motor intention space 5), as discussed above. In the case of object interactions, it is important that while the encoder 2 to the motor primitives module 8 can receive privileged information such as the state of the reference object, the proprioceptive information provided to the decoder 3 should be available in valid test settings. More specifically, in the case where the expert relates to a humanoid, the encoder 2 is provided with access to the state both of the humanoid as well as the object, whereas the decoder 3 only directly receives egocentric humanoid proprioceptive information. This choice of factorization means that, by construction, the decoder 3 will be reusable as a policy that only requires egocentric observations of the humanoid body. When reusing the skill module, any awareness of objects in a scene may be passed to a low level controller, such as the decoder neural network 3, as conditioning information.

A task policy may be trained to reuse the skills which have been distilled as described above.

The task policy may be trained in any suitable way. In an implementation, the task policy is trained using a reinforcement learning system. Any reinforcement learning system may be used including, for example: a policy-based system (e.g. an Advantage Actor Critic (A3C) system, Mnih et al. 2016, or a variant thereof), which directly parameterizes a policy, and optionally a value function; a Q-learning system, such as a Deep Q-learning Network (DQN) system or Double-DQN system, in which the output approximates an action-value function, and optionally a value of a state, for determining an action; a continuous control reinforcement learning system such as DDPG (Lillicrap et al. 2015) or a variant thereof; or a distributed reinforcement learning system such as IMPALA (Importance-Weighted Actor-Learner), Espholt et al., arXiv:1802.01561, or Recurrent Replay Distributed DQN (R2D2), Kapturowski et al. In one example implementation the reinforcement learning system comprises a model free IMPALA-style system with a single learner and many actors. The value function critic may be trained using off-policy correction via V-trace. The policy may then be updated using a variant of Maximum a Posteriori Policy Optimisation, with the m-step return modified to use the empirical returns and the value-function, instead of the Q-function.

The task policy may take as input visual information, such as the view as seen from a camera mounted on the head of a humanoid which the task policy controls, or state features which consist of the position of the object relative to the humanoid as well as the orientation of the object.

Figure 6:
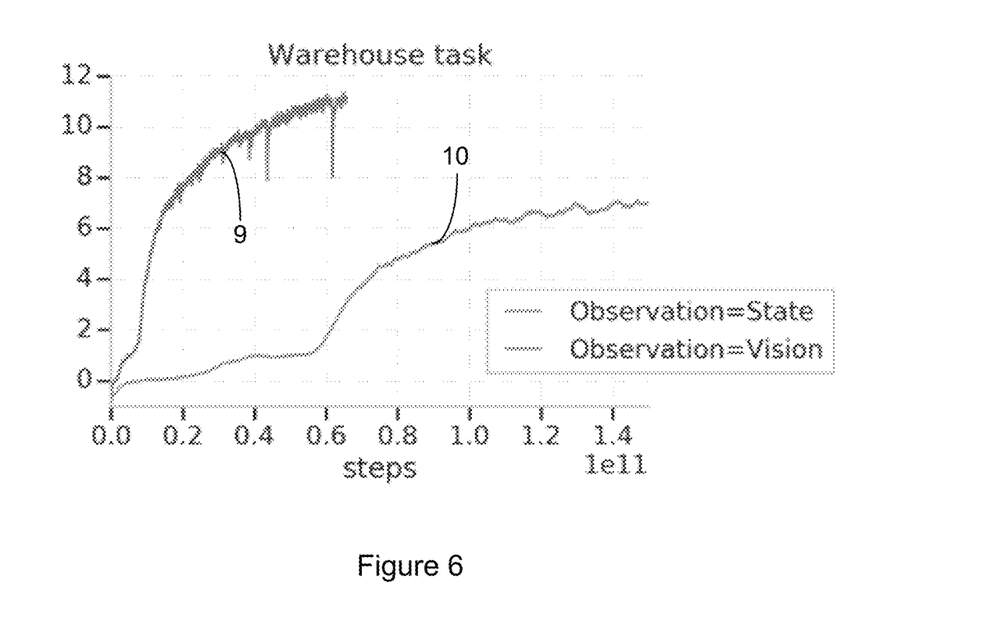
FIG. 6 shows a plot of results relating to the training of a task policy in a warehouse task.
Figure 7:
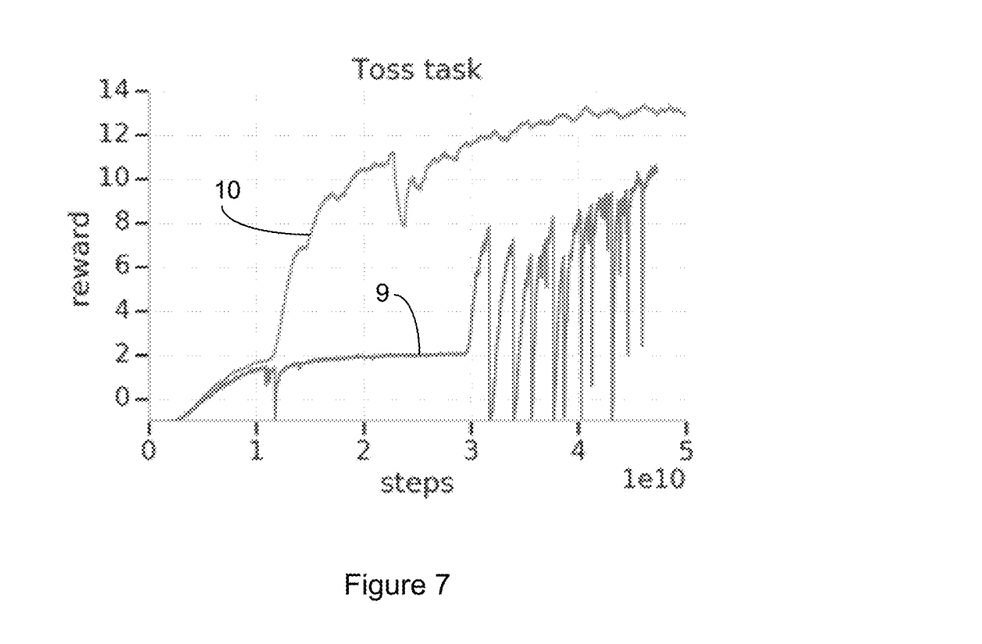
FIG. 7 shows a plot of results relating to the training of a task policy in a toss task.

FIGS. 6 and 7 relate to results obtained by training task policies in a "warehouse" task (picking up and moving a box from one location and setting it down in another) and "toss" task (catching a ball and then tossing it into a bucket) respectively.

The policies were trained on either state features consisting of the position of the object relative to the humanoid as well as the orientation of the object or visual observations comprising an egocentric camera mounted on the head of the humanoid, and it was found that successful reuse of the motor primitive module was possible using either state features or visual observations.

FIGS. 6 and 7 show representative learning curves comparing vision-based (highlighted by reference numeral 9) and state-based (highlighted by reference numeral 10) training on the warehouse task and toss task respectively. As can be seen, on the warehouse task visual information improved learning over state information, whereas state information improved learning over visual information on the toss task. However, both could successfully be used to train the task policy in either task.

As demonstrated, a low-level skill module (such as the motor primitive module) can be used to solve two challenging object interaction tasks when a high level task-specific policy is trained to reuse the low-level skills module on each task.

For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory program carrier for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them. The computer storage medium is not, however, a propagated signal.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit). For example, the processes and logic flows can be performed by and apparatus can also be implemented as a graphics processing unit (GPU).

Computers suitable for the execution of a computer program include, by way of example, can be based on general or special purpose microprocessors or both, or any other kind of central processing unit. Generally, a central processing unit will receive instructions and data from a read only memory or a random access memory or both. The elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer-implemented method of encoding behaviours for recall, the method comprising:
  obtaining a training trajectory representing an example behaviour, the training trajectory comprising, for each of a plurality of time steps during performance of the behaviour, (i) an observation representing a state of an environment at the time step and (ii) a training action performed at the time step;
  for a particular time step t of the plurality of time steps:
  generating action data $a_t$ for the time step t from (i) an observation $s_t$ representing the state of the environment at the time step t and one or more observations $[s_{(t+1)}, \ldots, s_{t+k}]$ that represent states of the environment at time steps $t+1, \ldots t+k$ after the time step t in the training sequence, comprising:
    generating an encoder input $x_t$ for the particular time step, wherein $x_t$ comprises the observation at the time step t and the one or more observations representing states of the environment at a the one or more future time step from the training trajectory such that;
    encoding the encoder input using an encoder neural network to determine parameters of a posterior distribution $q_t(z_t|x_t)$ over a set of motor primitive latent variables;
    sampling from the posterior distribution $q_t(z_t|x_t)$ to determine a multi-dimensional motor primitive latent variable $z_t$ for the particular time step; and
    decoding (i) the multi-dimensional motor primitive latent variable $z_t$ for the particular time step and (ii) the observation $s_t$ at the particular time step using a generative neural network to generate action data $a_t$ for the time step; and
  training the encoder neural network and the generative neural network using an objective function dependent upon (i) the action data $a_t$ output by the generative neural network for the particular time step and upon (ii) data representing the training action in the training trajectory at the particular time step.

2. The method as claimed in claim 1 wherein the objective function further comprises a term dependent upon a difference between the posterior distribution and a prior distribution for the motor primitive latent variables.

3. The method as claimed in claim 2 wherein the prior distribution comprises an autoregressive distribution such that at each time step the prior distribution depends on a combination of a times the prior distribution at a previous time step where $|\alpha|<1$, and a noise component.

4. The method as claimed in claim 1 further comprising recalling learned behaviour by encoding a sequence of observations of a target behaviour using the encoder neural network to generate a set of motor primitive latent variables for the target behaviour and then providing the set of motor primitive latent variables for the target behaviour to the generative neural network to provide action data for a sequence of actions to be implemented to perform to implement the target behaviour.

5. The method as claimed in claim 1, wherein the encoder input for the particular time step further comprises the multi-dimensional motor primitive latent variable for the time step preceding the particular time step in the training trajectory.

6. The method as claimed in claim 1, wherein the observations in the training trajectory are generated by applying first perturbations to observations in a nominal trajectory for the behaviour wherein the nominal trajectory is given by a sequence of nominal state action pairs $\{s^*_t, a^*_t\}_{1 \ldots T}$ obtained by executing $\mu_E(s)$ (the mean action of an expert in state s) recursively.

7. The method as claimed in claim 6, wherein the actions in the training trajectory are generated by applying second perturbations to actions in the nominal trajectory for the behaviour.

8. The method as claimed in claim 7, wherein the first perturbations are based on perturbations drawn from a perturbation distribution, and wherein the second perturbations are based on a state-action Jacobian of a policy used to generate the nominal trajectory and the perturbations drawn from the perturbation distribution.

9. A system comprising one or more computers and one or more storage devices storing instructions that when executed by the one or more computers cause the one or more computers to perform operations for encoding behaviours for recall, the operations comprising:
  obtaining a training trajectory representing an example behaviour, the training trajectory comprising, for each of a plurality of time steps during performance of the behaviour, (i) an observation representing a state of an environment at the time step and (ii) a training action performed at the time step;
  for a particular time step t of the plurality of time steps:
  generating action data $a_t$ for the time step t from (i) an observation $s_t$ representing the state of the environment at the time step t and one or more observations $[s_{(t+1)}, \ldots, s_{t+k}]$ that represent states of the environment at time steps $t+1, \ldots t+k$ after the time step t in the training sequence, comprising:
    generating an encoder input $x_t$ for the particular time step, wherein $x_t$ comprises the observation at the time step t and the one or more observations representing states of the environment at a the one or more future time step from the training trajectory such that;
    encoding the encoder input using an encoder neural network to determine parameters of a posterior distribution $q_t(z_t|x_t)$ over a set of motor primitive latent variables;
    sampling from the posterior distribution $q_t(z_t|x_t)$ to determine a multi-dimensional motor primitive latent variable $z_t$ for the particular time step; and
    decoding (i) the multi-dimensional motor primitive latent variable $z_t$ for the particular time step and (ii) the observation $s_t$ at the particular time step using a generative neural network to generate action data $a_t$ for the time step; and
  training the encoder neural network and the generative neural network using an objective function dependent upon (i) the action data $a_t$ output by the generative neural network for the particular time step and upon (ii) data representing the training action in the training trajectory at the particular time step.

10. The system as claimed in claim 9 wherein the objective function further comprises a term dependent upon a difference between the posterior distribution and a prior distribution for the motor primitive latent variables.

11. The system as claimed in claim 10 wherein the prior distribution comprises an autoregressive distribution such that at each time step the prior distribution depends on a combination of a times the prior distribution at a previous time step where $|\alpha|<1$, and a noise component.

12. The system as claimed in claim 9 further comprising recalling learned behaviour by encoding a sequence of observations of a target behaviour using the encoder neural network to generate a set of motor primitive latent variables for the target behaviour and then providing the set of motor primitive latent variables for the target behaviour to the generative neural network to provide action data for a sequence of actions to be implemented to perform to implement the target behaviour.

13. The system as claimed in claim 9, wherein the encoder input for the particular time step further comprises the multi-dimensional motor primitive latent variable for the time step preceding the particular time step in the training trajectory.

14. The system as claimed in claim 9, wherein the observations in the training trajectory are generated by applying first perturbations to observations in a nominal trajectory for the behaviour wherein the nominal trajectory is given by a sequence of nominal state action pairs $\{s^*_t, a^*_t\}_{1 \ldots T}$ obtained by executing $\mu_E(s)$ (the mean action of the expert in state s) recursively.

15. The system as claimed in claim 14, wherein the actions in the training trajectory are generated by applying second perturbations to actions in the nominal trajectory for the behaviour.

16. The system as claimed in claim 15, wherein the first perturbations are based on perturbations drawn from a perturbation distribution, and wherein the second perturbations are based on a state-action Jacobian of a policy used to generate the nominal trajectory and the perturbations drawn from the perturbation distribution.

17. One or more non-transitory computer-readable storage media storing instructions that when executed by one or more computers cause the one or more computers to perform operations for encoding behaviours for recall, the operations comprising:
obtaining a training trajectory representing an example behaviour, the training trajectory comprising, for each of a plurality of time steps during performance of the behaviour, (i) an observation representing a state of an environment at the time step and (ii) a training action performed at the time step;
for a particular time step t of the plurality of time steps: generating action data $a_t$ for the time step t from (i) an observation $s_t$ representing the state of the environment at the time step t and one or more observations $[s_{(t+1)}, \ldots, s_{t+k}]$ that represent states of the environment at time steps t+1, . . . t+k after the time step t in the training sequence, comprising:
generating an encoder input $x_t$ for the particular time step, wherein $x_t$ comprises the observation at the time step t and the one or more observations representing states of the environment at a the one or more future time step from the training trajectory such that;
encoding the encoder input using an encoder neural network to determine parameters of a posterior distribution $q_t(z_t|x_t)$ over a set of motor primitive latent variables;
sampling from the posterior distribution $q_t(z_t|x_t)$ to determine a multi-dimensional motor primitive latent variable $z_t$ for the particular time step; and
decoding (i) the multi-dimensional motor primitive latent variable $z_t$ for the particular time step and (ii) the observation $s_t$ at the particular time step using a generative neural network to generate action data $a_t$ for the time step; and
training the encoder neural network and the generative neural network using an objective function dependent upon (i) the action data $a_t$ output by the generative neural network for the particular time step and upon (ii) data representing the training action in the training trajectory at the particular time step.

18. The one-or more non-transitory computer-readable storage media as claimed in claim 17 wherein the objective function further comprises a term dependent upon a difference between the posterior distribution and a prior distribution for the motor primitive latent variables.

* * * * *